United States Patent [19]

Land

[11] 3,815,971
[45] June 11, 1974

[54] PHOTOGRAPHIC PROCESSING PROJECTING APPARATUS
[75] Inventor: Edwin H. Land, Cambridge, Mass.
[73] Assignee: Polaroid Corporation, Cambridge, Mass.
[22] Filed: June 18, 1973
[21] Appl. No.: 371,146

Related U.S. Application Data
[63] Continuation of Ser. No. 174,375, Aug. 24, 1971, abandoned, which is a continuation-in-part of Ser. No. 755,901, Aug. 28, 1968, Pat. No. 3,615,127.

[52] U.S. Cl.................... 352/130, 95/89 R, 352/78
[51] Int. Cl........................................... G03c 11/00
[58] Field of Search............ 352/78, 130; 95/13, 14, 95/19, 89

[56] References Cited
UNITED STATES PATENTS
3,227,508  1/1966  Bararo............................ 353/18 X
3,615,127  10/1971  Land................................. 352/78 R Primary Examiner—Richard M. Sheer

[57] ABSTRACT

Photographic apparatus adapted for operation of a motion picture film cassette for processing of a film strip carried in such cassette and for subsequent projection of the recorded images employing a housing configured to receive the cassette with its projection station in operative relation to a projection lens assembly and a projection lamp, and including a blinder member configured for precluding light from entering the projection station during film processing operations. Preferably, the processing operation is carried out during rewinding of the film strip and the apparatus includes an interlock mechanism configured to automatically displace the blinder member into its operative position and continuously maintain it therein throughout this rewinding operation. In an alternative embodiment, the blinder member is mounted on the cassette and the projector apparatus includes a lever member adapted for actuation of the cassette blinder.

32 Claims, 9 Drawing Figures

PATENTED JUN 11 1974

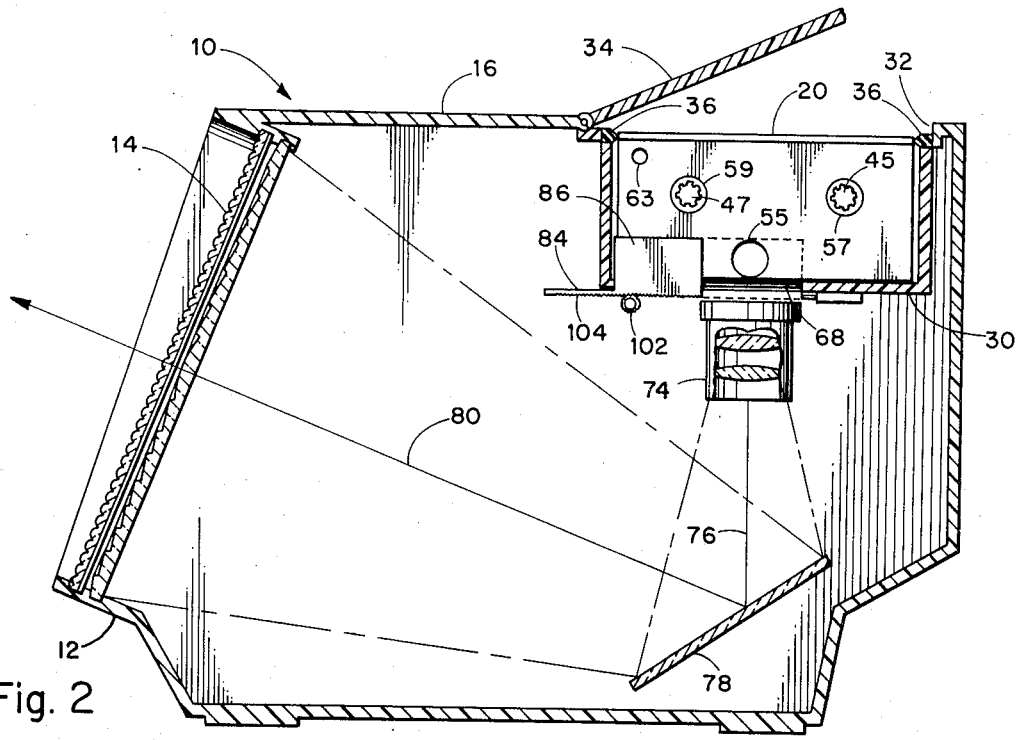
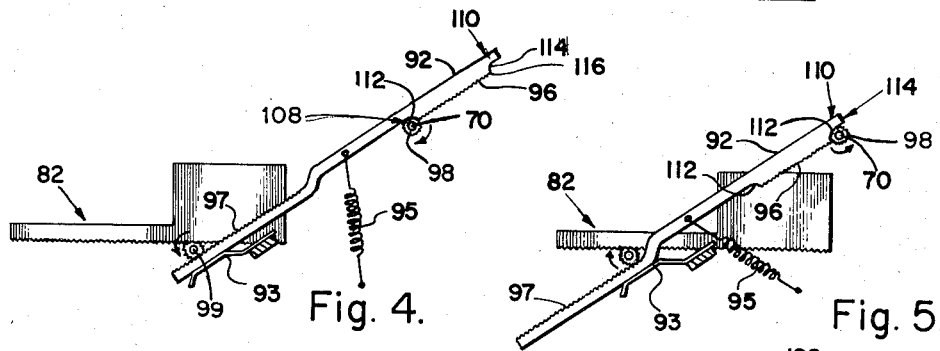
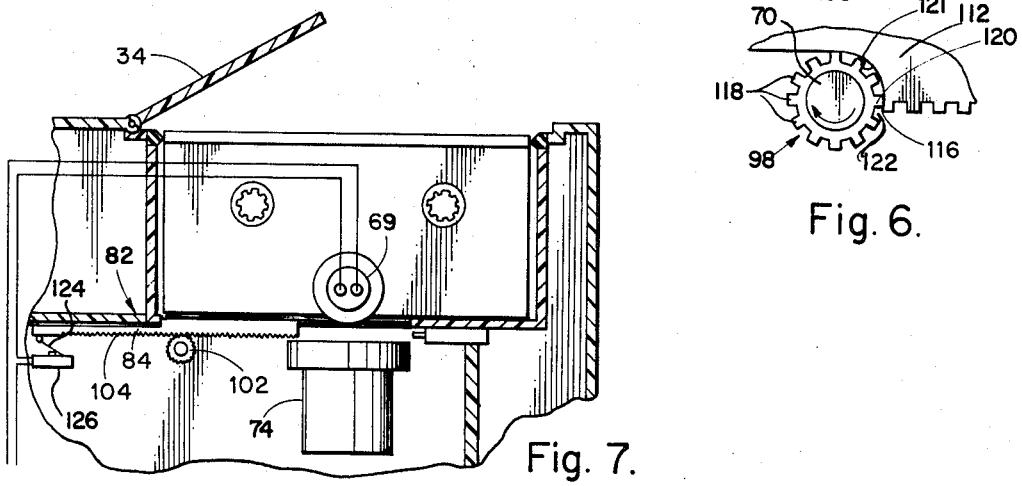
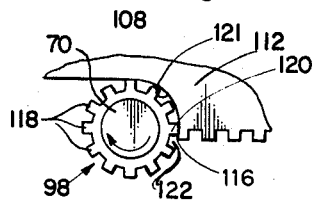

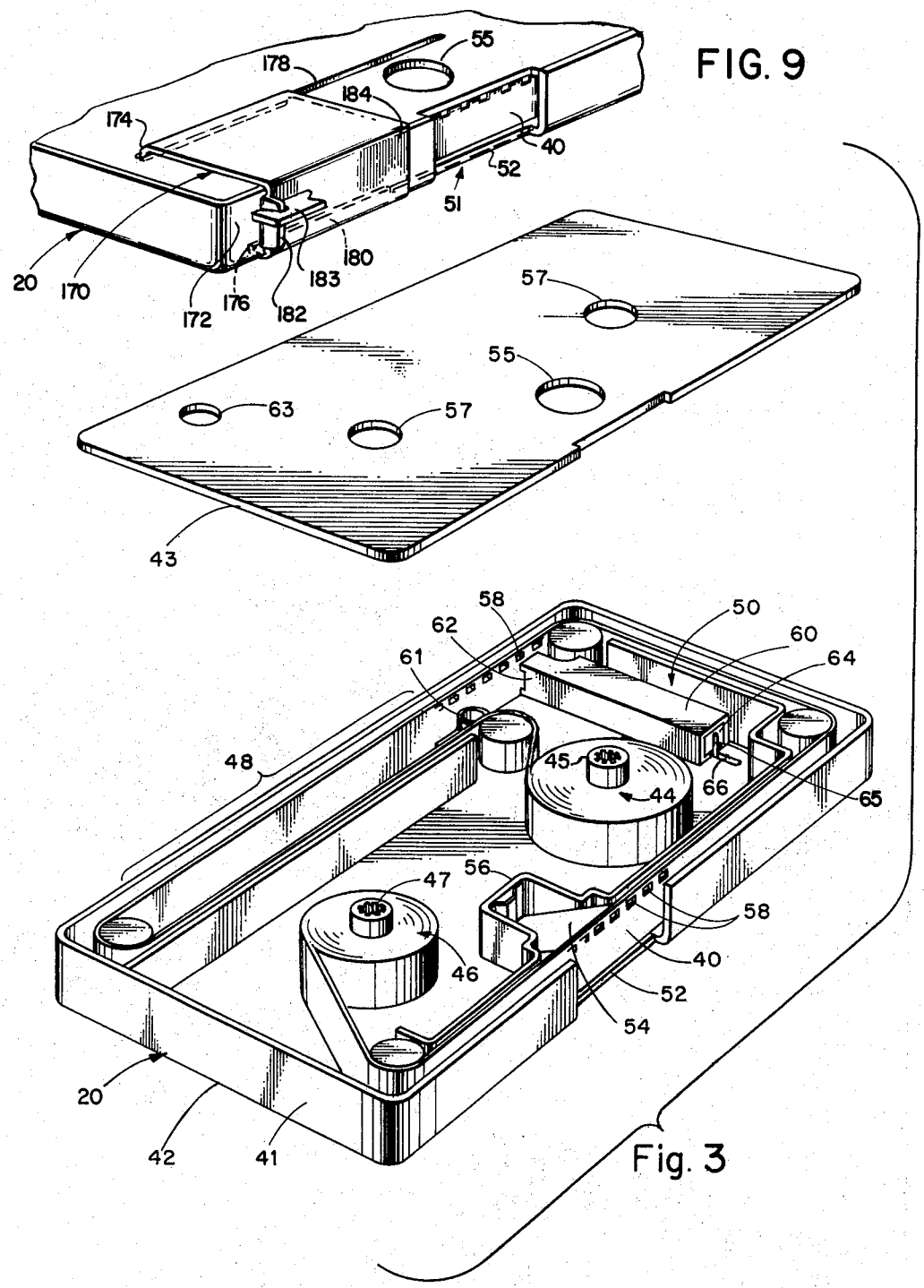

PHOTOGRAPHIC PROCESSING PROJECTING APPARATUS

CROSS REFERENCES TO RELATED APPLICATIONS

This is a continuation of application Ser. No. 174,375 filed Aug. 24, 1971, now abandoned which is, in turn, a continuation-in-part of Ser. No. 755,901 filed Aug. 28, 1968, now. U.S. Pat. No. 3,615,127 issued Oct. 26, 1971.

BACKGROUND OF THE INVENTION

1. Field of the Invention

This invention relates to a photographic system and more particularly to motion picture projection system and to apparatus for, and a method of, operation of a photographic film cassette for processing of its film strip and subsequent projection of the images recorded thereon.

2. Description of the Prior Art

The aforementioned parent application describes a motion picture system including a multipurpose cassette within which the several operations of exposure, processing and projection of the recorded images are accomplished without transferring the film from the cassette. Advantageously, the processing of the film may be provided with the cassette mounted in the projector apparatus, prior to actual projection of the images. However, conventional projector apparatus fail to provide a suitable light-tight environment for the processing operation. For example, in presently available projector apparatus portions of the film are often transported exteriorly of the apparatus housing for advancement through the projection lens system such that the film is progressively exposed to ambient light. Further, in apparatus wherein a substantially opaque cabinet encloses the projection system, the film is still exposed to ambient light entering through the projection lens, and additionally, is generally exposed throughout its operations to illumination from the projection lamp.

Consequently, it is an important object of this invention to provide improved photographic apparatus for operation of a photographic cassette.

Another primary object of this invention is to provide improved motion picture system for processing and subsequent projection of a photographic film strip.

Still another object of this invention is to provide improved photographic projector or viewer apparatus suitable for operation of a photographic film cassette during film processing.

A further object of this invention is to provide an improved method for processing of and subsequently viewing or projecting images recorded on a photographic film strip.

SUMMARY OF THE INVENTION

The projector apparatus of the present invention is intended for use with a compact multipurpose film cassette which comprises a substantially opaque casing including a projection station at which incremental sections of the film strip may be presented to facilitate film exposure and projection, a processing station for developing to a viewable condition images recorded on such film, and means for advancing the film strip through such stations for facilitating processing of such film strip and subsequent projection of the images recorded thereon. The projector apparatus itself comprises: means for receiving such cassette; means for precluding light rays from entering such projection station during film processing operations and means for illuminating incremental film portions progressively presented at such projection station.

In its preferred embodiment, the apparatus is a rear projection viewer comprising a housing defined in part by a transparent viewing screen. A cassette-receiving well in communication with the top surface of the housing is configured to receive the cassette in a given location with its projection station in operative relation with a projection lens system and a projection lamp of the apparatus which facilitate projection of film images along a given optical path from the projection station to the transparent screen. Displaceably mounted within the housing is a blinder, configured for displacement into a blocking position across the optical path during the processing operation so as to exclude ambient light transmitted by the projection screen from reaching the film during this operation.

Preferably, the cassette includes coplanar supply and take-up spools, to which opposite ends of a film strip are permanently attached, for storing the film strip and for advancing it across a film gate or opening, which is operative both as an exposure station for recording images on the film strip and as a projection station for the projection of images following exposure and processing. In a preferred operation of the cassette, the unexposed photosensitive film strip, initially wound upon the supply spool, is preferably advanced in a forward direction from the supply spool across the aforementioned opening onto the take-up spool for exposure to image bearing light of incremental portions of the film strip, progressively presented at the cassette opening. Such exposure is conventionally carried out in a camera apparatus. Following exposure, the cassette is preferably loaded into the projector apparatus of the invention in which the motion of the film is reversed, this time passing from the take-up spool onto the supply spool. In its movement in the reverse direction, or that is, the rewind direction, the film strip is subjected to a processing treatment in which a viscous fluid, contained in a processing station of the cassette, is deposited on the film strip. Consequently, in the preferred embodiment, the projector apparatus includes an interlock mechanism which couples its spool drive mechanism to the blinder and automatically displaces the latter into its blocking position and maintains it therein throughout rewinding of the film strip.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof, will best be understood from the following description of the preferred embodiment when read in connection with the accompanying drawings wherein like numbers have been employed in different figures to denote the same parts and wherein:

FIG. 2 is a view in section taken along the line 2—2 of FIG. 1;

FIG. 3 is a diagrammatic view in perspective of the motion picture film cassette shown in FIG. 1;

FIG. 4 is a fragmentary view in elevation of the blinder and rack arrangement of FIG. 1 illustrating their respective locations when they are disposed in a first operative position;

FIG. 5 is a view similar to FIG. 4 illustrating the blinder and rack arrangement when they are disposed in a seond operative position;

FIG. 6 is a greatly enlarged, fragmentary view of a portion of the rack member as shown in FIG. 4;

FIG. 7 is a fragmentary view in elevation illustrating an alternative embodiment of the invention;

FIG. 9 is a fragmentary view in perspective of an alternative embodiment of a cassette operable with the present invention.

DESCRIPTION OF THE PREFERRED EMBODIMENTS

Figure 1:
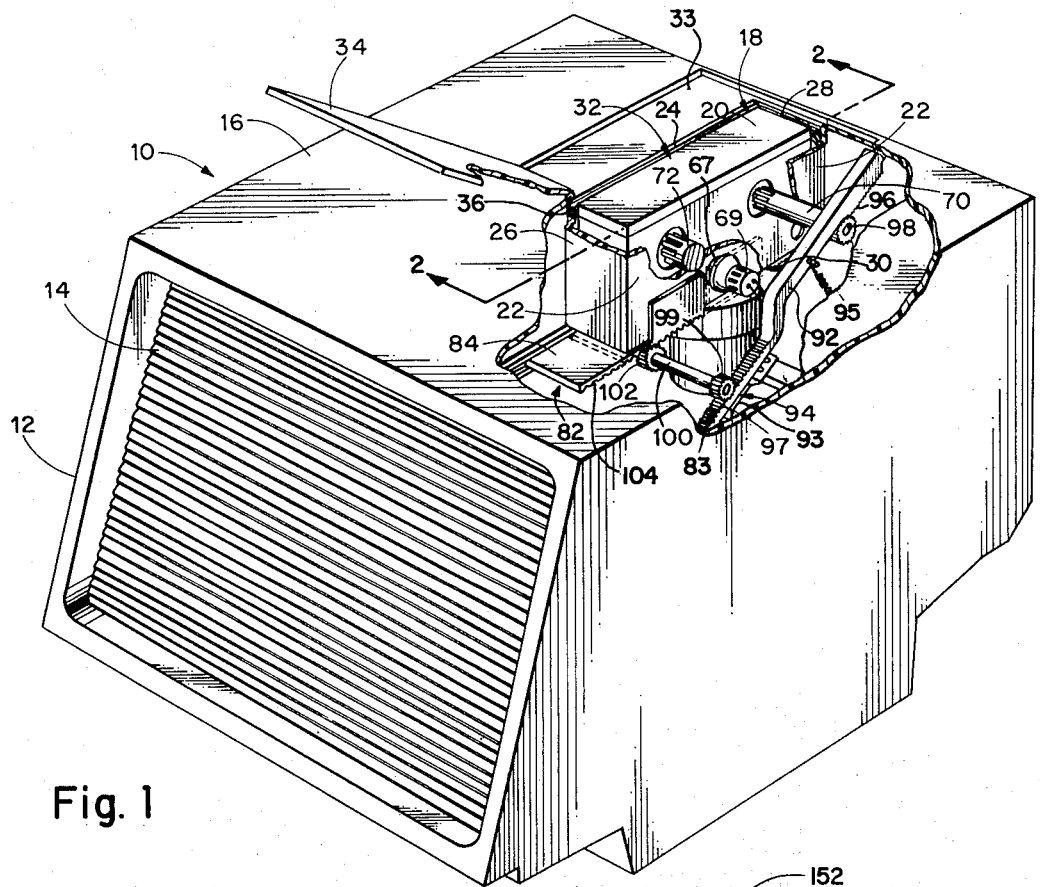
FIG. 1 is a diagrammatic view in perspective and partially cutaway of a motion picture projector apparatus embodying the features of this invention and having a multipurpose motion picture film handling cassette mounted therein.

As shown in FIGS. 1 and 2, the projector apparatus of the present invention preferably takes the form of a rear projection viewer 10 which comprises a box-like housing 12 defined in part by a front viewing screen 14. Positioned rearwardly of the screen 14 in an adjoining relation to the top surface 16 of the housing 12 is a cassette-receiving well 18 which is made up of sidewalls 22 and 24, end walls 26 and 28 and a bottom wall member 30. These form a box-like, open ended cavity in communication with an opening 32 disposed in a recessed portion 33 of the top surface 16. The recess 33 is configured to fit a door member 34 which is pivotally mounted at the forward edge of the recess and controls access to the well 18. Hence, the door 34 is mounted for pivotal motion between a closed position blocking the opening 32 and an open position permitting insertion and removal of a cassette 20.

In the preferred embodiment, means are provided for excluding light from entering the well 18 in the proximity of the opening 32. Preferably, a sealing member or gasket 36 of a felt material, for example, or any elastomeric material is disposed around the periphery of the cassette-receiving well 18 and adapted for contact with the perimeter of the cassette 20. Of course, many different sealing arrangements (not shown) may be applicable in other applications, and it is to be understood that the door 34 may also be suitably employed as a light-baffle member for the well opening 32.

The term "projector" is used herein in a comprehensive sense, i.e., to broadly refer to systems wherein the visible image recorded on a sheet of material is reimaged for viewing purposes and is not restricted to those systems in which the recorded visible image is projected onto a remote screen.

The cassette 20 is a multipurpose motion picture film cassette, such as described in the parent application and shown herein in FIG. 3, having a body portion 41 configured to be joined to cover portion 43 so as to form a generally parallelepiped casing or housing 42 which substantially encloses a photographic film strip 40. In this figure, the cover 43 is shown separated from the body 41 so as to reveal the cassette interior. Initially most of the film 40 in its photosensitive state, is coiled on (and permanently attached, at one of its ends, not shown, to) a rotatable supply spool or reel 44 and extends within the casing 42 in a somewhat circuitous path from the spool 44 to a take-up spool or reel 46 to which the opposite end of the film is attached. It is to be understood that the terms spool and reel are used interchangeably herein and are broadly intended to represent any suitable member on which the film may be wound.

Within the casing 42, the film 40 extends between spools 44 and 46 through a drying station 48, a processing station 50 and an exposure and projection station 51 which includes a film gate or opening 52 which functions at different times to facilitate exposure and projection. Thus it will be seen that the film gate 52 constitutes an opening that serves to provide the cassette 20 with a film exposure station where progressive incremental sections of the film strip 40 may be exposed to image-carrying light rays when the cassette is mounted in an appropriate camera, and that serves to provide the cassette with a film projection station where light rays from a projection illumination system 34 may be directed through progressive incremental sections of the film strip when the cassette is mounted in the projector 10. At the same time, the cassette 20 includes a normally inoperative film processing station comprising an applicator 60 which may be selectively rendered operable. In this embodiment, a prism 54 is mounted behind the film strip 40 in an adjoining relation to both the opening 52 and an illumination aperture 55 so as to facilitate film illumination during projection. Consequently, in the preferred embodiment the projection station 51 comprises opening 52, prism 54 and aperture 55. In an alternative embodiment, it is contemplated that the prism 54, or other suitable reflector, will be part of the projector 10.

Behind the prism 54 is a baffle member 56 which extends around the prism and across the opening 52, and prevents light from penetrating the interior of the cassette from this area. A pair of apertures 57 and 59 permit extension of the film hubs 45 and 47 through the cover 43 in a conventional light baffled arrangement and allow driving engagement to the film spools as later explained. Additionally, light baffled orifices 61 and 62 are included in the cassette 20 to permit passage of air through drying station 48.

In its initial use, the cassette 20 is positioned within a camera apparatus (not shown) for exposure of the photosensitive film strip 40, contained within the cassette at that time. In the camera, the cassette opening 52 operates as an exposure station through which image bearing light rays are directed by the camera lens to the photosensitive film segments progressively advanced across the opening during passage of the film 40 from the supply spool 44 to the take-up spool 46. The film strip 40 is drawn onto the take-up spool 46 and is simultaneously advanced past the opening 52 in increments by a typical claw mechanism (not shown) cooperating with the sprocket holes 58 provided adjacent one edge of the film strip. During this exposure sequence, the drying station 48 and the processing station 50 are passive.

As indicated in the parent application, after exposure of the film strip 40, approximately its entire length will then have been unwound from the supply spool 44 and coiled onto the take-up spool 46. Following the exposure operation, the cassette 20 is then positioned within a projector apparatus or the like for processing of the film strip and subsequent projection of the recorded images. Processing is accomplished, in part, by means of a processor 50 which preferably comprises a container 60 configured for retaining a supply of a suitable processing fluid (not shown) and for dispensing such fluid through an orifice or mouth 62 at one of its ends. The processing fluid is expressed from the orifice 62 by means of a plunger 64 which is appropriately displaced within the container 60 during return of the film strip 40 to the supply spool 44. For example, as explained in the parent application, the plunger 64 is engageable by and displaced in accordance with operation of a plunger driver 65 of the projector apparatus projecting inward through a slot 66 in the wall of the cassette; the driver 65 being activated in this embodiment during the time the film is initially being rewound onto the supply spool 44.

Consequently in operation of the projector apparatus of the present invention, the cassette 20 is positioned within the well 18 as shown in FIGS. 1 and 2 with its openings 52 positioned in registration with an opening 68 of the base 30 of the well 18. In this location, the cassette 20 is positioned for operative engagement with various elements of the apparatus as subsequently described.

Hence, the illumination aperture 55 is located in alignment with an aperture 67 of the well 18 and a conventional projection lamp 69. The latter element being configured to direct illumination onto the cassette, to prism 54, and then outwardly through incremental segments of the film 40 as they are progressively advanced across opening 52. For driving the film spools 44 and 46, a pair of drive spindles 70 and 72 are mounted alongside the well 18 for displacement into engagement with the respective film spools 44 and 46. Additionally, a fan (not shown) pumps air through the light baffled orifice 61 of the cassette 20 into its interior for drying of the film 40 following processing.

Mounted beneath the cassette-receiving well 18, are conventional projector components (not shown) such as an aperture plate and a claw mechanism. Additionally, a suitable rotary shutter (not shown in this embodiment) and a projection lens assembly 74 are positioned below the well 18. The latter is configured to transmit the image bearing illumination emanating from the opening 68 and focus it at a given point, as for example, in the plane of transparent screen 14. In the illustrated embodiment, the projection lens assembly 74 is adapted to direct the image bearing rays along a first optical axis 76 to a mirror 78 which redirects the rays along a second optical axis 80 to the screen 14. Hence, the opening 68, lens assembly 74, mirror 78 and screen 14 comprise image projection means or that is means for providing a predetermined optical path between the incremental sections of the film strip 40, displayed at the cassette opening 52, and a point exterior to the apparatus so as to permit viewing or projection of the recorded images.

In the apparatus 10 means, such as a blinder member 82, are provided for precluding light rays from entering projection station 51 during processing operations. Hence, blinder 82 provides means for maintaining the sequentially advanced incremental film portions presented at opening 52 in a continuous light-tight environment throughout this operation. The blinder member 82 is mounted for selective displacement into a blocking position across the apertures 67 and 68 which results in a blocking of these apertures, as well as of the cassette openings 52 and 55. Hence, in its blocking position, the blinder 82 precludes light from reaching the film strip 40 from the screen 14 or the lamp 69. In this arrangement, the blinder 82 includes a lower plate member or aperture plate blinder 84 configured for blocking the projection path 76, and a side member or illumination aperture blinder 86 which blocks, or closes off, the illumination aperture 55 and thereby also prevents film illumination from this source.

It should be understood that in projection apparatus configured for projection of images to a remote screen the blinder will block the projection lens. Moreover, since the cassette could employ separate, discrete openings for exposure and projection, both would be blocked during processing operations.

In the preferred embodiment, automatic displacement of the blinder 82 into its blocking position is provided during film rewind by means of an interlock mechanism 83 which comprises a pinion gear arrangement 94 and a rack member, or rack bar 92. Carried on the rack bar 92 is a first and second rack portion 96 and 97 which are respectively in engagement with a pinion gear configuration 98 of shaft 70 and a pinion gear 99. The latter is, in turn, directly coupled through a shaft 100 to a similar pinion gear 102 which is in engagement with a rack configuration 104 of the underside of the shutter plate 84. The pinion gear shaft 100 and spindle shaft 70 are, of course, suitably mounted for rotation in conventional bearings (not shown). A slide member 93 biases rack bar 92 upwardly against the pinion gear 99 whereas a spring 95 biases it downwardly against shaft 70.

The rack bar 92 is constructed, as later explained in more detail in regard to FIGS. 4 and 5, such that it is laterally displaced across shaft 70, responsive to reversal of the shaft rotation, between a first position shown in FIGS. 1 and 4 and a second position shown in FIG. 5. Since the blinder 82 is directly coupled to the bar 92 and consequently moves simultaneously but in the opposite direction to that of the bar, the former is accordingly driven between a first, open position shown in bold lines in FIGS. 1 and 2 and second, blocking or closed position as shown in dotted lines in these figures.

Accordingly, as shown more clearly in FIG. 4, the rack bar 92 includes a pair of steps or indents 108 and 110 at the respective ends of its first rack configuration 96. These indents, 108 and 110, are configured to retain the rack bar 92 in its indicated first and second locations so long as the spindle shaft 70 continues to rotate in a given direction, and hence, include curved wall portions 112 and 114, respectively, which are configured to substantially conform to the diameter of the spindle shaft.

In operation, the rack bar 92 is translatable with respect to the shaft 70 so as to position either indent 108 or 110 over the shaft in accordance with the direction of rotation of the latter. That is, clockwise rotation of the shaft 70 during forward advancement of the film 40, displaces the rack bar 92 to the right in FIG. 2 (toward the rear of the viewer) until the shaft enters indent 108 as shown in FIG. 4. This displaces the blinder 82 to its open position. The rack bar 92 remains in this position, holding the blinder 82 open, until the direction of rotation of the shaft 70 is reversed. Consequently, when shaft 70 is driven in a counterclockwise direction which rewinds the film strip 40 on supply spool 44, the rack 92 moves to the left in FIG. 2

(toward the front of the viewer) until its indent 110 is positioned over the shaft, as shown in FIG. 5, which closes the blinder 82. Hence, rotation of the shaft 70 in either direction automatically moves the rack bar 92 and blinder 82 between their first and second positions respectively, and it should be understood that the bar 92, the pinion gear mechanism 94 and rack 104 of the shutter provide means interlocking the blinder member 82, (or, that is, the light precluding means) to the drive means of the apparatus.

Operative engagement between the rack 96 and the shaft 70, upon reversal of the latter's direction of rotation, is provided by a leading edge portion 116 of each indent such as is shown in FIG. 6 for indent 108. These leading edge portions 116 are provided by a reduction in the radius of the curved surfaces 110 and 112 as the edge of the rack 96 is approached. Hence, when the pinion gear configuration 96 is rotated in a direction such that its teeth 118 approach the rack 96 from the interior of the indent (clockwise for indent 108, see FIGS. 5 and 6) the rack bar 92 is slightly displaced as each gear tooth moves past edge 116. For example, as shown in FIG. 6, when one gear tooth designated as 120 in this illustration is in contact with the indent edge 116, a large portion 121 of the indent curvature 112 is held slightly out of engagement with the adjacent teeth. Upon reversal of the shaft direction to a clockwise rotation, the bar 92 (under bias from the spring 95) tends to move slightly to the right (not shown) as the outermost gear tooth 120 travels from edge 116 towards the interior of the indent 112. This forces the leading edge 116 into the spacing 122, next adjoining the gear tooth 120, and the rack bar 92 consequently climbs on the shaft 70 and travels across it until indent 108 is reached. Hence, rotation of the shaft 70 in a given direction moves the bar to an appropriate position and maintains it in that position until reversal of the shaft motion. The latter reversal, in turn, moves the bar laterally in the opposite direction to its other position and maintains it in that position until subsequent reversal of shaft motion.

In this embodiment, the blinder is interlocked or coupled to drive shaft 70 which is always rotated in accordance with spool rotation and hence reverses direction in accordance with the direction of rewind; however, it should be understood that the blinder may be operatively coupled to any means indicative of the processing operation. Hence, the blinder may be interlocked to the means for actuating the processor of the cassette or to any part of the projector indicative of film rewind etc.

In order to explain the overall operation of the apparatus, it is necessary to refer once again to FIG. 1. As previously indicated, processing of the film strip 40 following exposure is preferably accomplished during the first rewind of the film strip. That is, the film is advanced in a first or forward direction during exposure, then advanced in an opposite direction during processing. Hence, following exposure the cassette 20 is inserted within the well 18 and the apparatus 10 turned on by any appropriate means, (not shown). Initially, the spindle shaft 70 is driven in a clockwise direction by any conventional means, such as a motor or the like. (not shown) to rewind the film 40 onto supply spool 44. At this time, the processor 50 is activated by the driver 65 to dispense the processing fluid from the container 60 to the film. If the blinder 82 is open at the start up, initial rotation of the spindle shaft 70 in a counterclockwise direction displaces the rack bar 92 forwardly (shown in FIG. 5) which, in turn, displaces the blinder rearwardly as shown in dotted lines in FIG. 1 so as to block the cassette openings 52 and 55. Then, the continued rotation of the shaft 70 in this counterclockwise direction maintains the blinder member in the closed position throughout the rewind operation.

Following completion of the rewind operation, rotation of the spindle shaft 70 (along with shaft 72) is reversed to a counterclockwise direction so as to drive the film in a forward direction for projection. At this reversal of shaft rotation to a clockwise direction the rack bar 92 moves rearwardly in the apparatus 10, and, in turn, simultaneously displaces the blinder 82 forwardly to its open position. At this time, the claw mechanism (not shown) is brought into engagement with the sprocket holes 48 of the film 40 to provide for conventional progressive advancement of incremental portions of the film across the cassette opening 52. Following completion of the projection run the film strip 40 may be rewound to supply spool 44 prior to removal of the cassette from the apparatus. Advantageously, this latter rewinding of the film 40, which is accomplished by reversing the direction of rotation of shaft 70 to a counterclockwise direction, displaces the blinder 82 into its blocking position and consequently leaves the apparatus in an appropriate condition for subsequent processing and projection of further cassettes.

It should be understood, however, that the cassette 20 may be removed immediately following the projection operation without rewinding of the film. In this case, the blinder 82 is not left in a blocking position; however, initiation of counterclockwise rotation of the drive spindle 70 for rewinding of the next cassette will immediately close the blinder so as to provide the proper light-tight environment for processing if the latter is required for that particular cassette. This means, of course, that a portion of the trailing end of the film strip 40 may be exposed to illumination in the projector apparatus 10; however, any such portion would be of very small length and hence, negligible.

In this embodiment, it is intended that both shafts 70 and 72 be directly driven at all times by the drive means (not shown) of the viewer 10. However, it should be understood that the shafts 70 and 72 may be alternately driven, in which case the non-driven spindle will be appropriately rotated by engagement with its film spool. Hence, shaft 70 will always be rotated in both directions whether directly driven, or not, and consequently open and close the blinder 82.

In an alternative embodiment, shown in FIG. 7, the blinder 82 is designed to block opening 68 and simultaneously preclude operation of the projection lamp 69, for example, disconnect it from its source of power (not shown) during the processing operation. In this embodiment the side blinder plate 86 is omitted whereas the aperture plate blinder 84 is adapted, in its open position, to engage arm 124 of a conventional, normally off switch 126, provided in series between the projection lamp 69 and the source of power, so as to thereby permit energization of the lamp only when the blinder is displaced to its open position. Stated otherwise, as the blinder 82 is moved to its closed position, the switch arm 124 is released and the lamp shut off. In this embodiment, the lamp 69 is configured to at least equal the diameter of aperture 67 so that when the lamp is off, any extraneous light is precluded from reaching the film through this aperture.

Advantageously, a blinder member 170 may be mounted on the cassette 20 as shown in FIG. 9, rather than in the projector apparatus. In this embodiment, the blinder 170 is extended around one edge 172 of the cassette 20 and slidably retained therearound by engagement of inwardly turned end portions 174 and 176 with slots 178 and 180, respectively. One end of the blinder 170 carries an outwardly turned lip or flange 182 for facilitating its operation. In use, the blinder may be automatically closed and opened in the projector by means of a driver member 183 in a manner similar to the blinder operation described for the preferred embodiment. For example, the blinder plate 84 of FIGS. 1 or 7 may be forshortened and provided with an indent configured to receive the flange 182 of the cassette blinder 170. Then displacement of the rack bar 92 will consequently actuate, i.e., either close or open, the blinder 170 appropriately during operation of the apparatus. Alternatively, a rack (not shown) may be carried on the blinder face 184 and adapted for engagement with pinion gear 102 of the preferred embodiment when the cassette 20 is received in its operative position in the viewer.

Of course, the blinder 170 may also be automatically or manually closed during removal of the cassette from the camera. Hence, in such an arrangement, the viewer apparatus need only displace the blinder 170 to its open position following the processing operation, i.e., following rewind.

Figure 8:
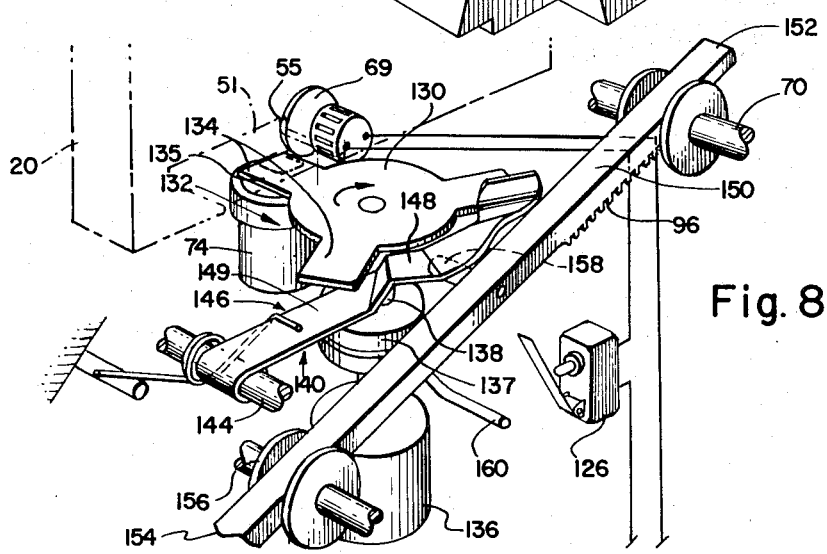
FIG. 8 is a fragmentary view in perspective illustrating another embodiment of the invention.

As illustrated in FIG. 8, it may be advantageous in some applications of the improved projector apparatus of the invention, to employ the conventional projector shutter 130 for the dual function of providing a synchronized shutter during the projection operation and a blinder during the process operation. As shown in this figure, the shutter 130 is a substantially flat disc having cutout, peripheral portions 132 which result in three radially extending blade-like elements 134. A conventional motor 136 is adapted to rotate the shutter 130 in appropriate fashion through a slip clutch 137 and a shaft 138 such that the blades 134 sequentially pass between the aperture plate 68 of well 18 and the projection lens 74. Means, such as lock member 140, are included for stopping the shutter member and for locating it such that one of its blades 135 is maintained in registration with the cassette opening 51 during the processing operation. For proper operation of the unit, the claw mechanism (not shown) is mechanically coupled to the shutter 130 so as to be always maintained in synchronism therewith.

In the illustrated embodiment of FIG. 8, the shutter-lock 140 includes an arm 142 which is mounted for rotation on a shaft 144. The arm 142 extends beneath the shutter 130 and is normally biased downwardly, out of engagement with the latter, by a spring 146. An offset portion 148 of the arm 142 is configured to mesh or mate with one of the shutter cutouts 132 and properly locate the shutter as the lock-arm is raised in accordance with displacement of a rack or bar 150 towards the lock-arm. In this regard, the rack bar 150 is similar to the rack bar 92 of the previously described embodiment in that it includes at one end 152 a rack 96 and indents 108 and 110 operatively coupled to the drive spindle 70. However, it differs in the present embodiment, in that the other end 154 of the rack bar is supported in a guide roller 156 and the bar carries a pair of lug members 158 and 160 which are adapted for actuation of the lock-arm 142 and a switch means 126, respectively.

As in the embodiment of FIGS. 1 and 2, at the start of the rewind operation, the rack bar 150 is driven forward by a clockwise rotation of shaft 70 such that its lug 158 lifts arm 142 and engages offset 148 in one opening 132 of the shutter 130. This positions blade 135 across aperture plate 68 and, hence, blocks light from entering the cassette opening through the lens system. At this time lug member 160 has moved out of contact with the switch 126 so as to shut off lamp 69. Consequently, the film strip of the cassette is automatically maintained in a light-tight environment during each rewind operation. Upon forward advancement of the film (counterclockwise rotation of shaft 70) the bar 150 is displaced rearwardly away from the shutter 130 releasing it and energizing lamp 69.

Those familiar with the photographic arts will readily appreciate the novel and highly unique advantages of this invention which provides an improved photographic system and a compact projection apparatus capable of operation of a photographic cassette for film processing and subsequent projection of the images recorded on its film strip. The apparatus uniquely provides a single operative location of the cassette configured for producing a light-tight environment during processing operation and a projection system for subsequent display of the film images. This is accomplished by means of a blinder member which is configured for displacement across the cassette opening during processing operations. In the preferred embodiments, actuation of the blinder mechanism is automatically provided in the projector apparatus by means of an interlock which displaces the blinder into its blocking position during each rewind of the cassette and prevents exposure of the film during the latter operation.

This invention may be practiced or embodied in still other ways without departing from the spirit or essential character thereof. The preferred embodiment described therein is therefore illustrative and not restrictive, the scope of the invention being indicated by the appended claims, and all variations which come within the meaning of the claims are intended to be embraced therein.

What is claimed is:

1. Photographic apparatus for use with a photographic film handling cassette including a strip of photographic film, film processing means configured for operation during advancement of such film strip, a projection station wherein incremental sections of such film strip may be progressively presented for projection or viewing purposes after being processed, and means for facilitating advancement of such film strip through such processing means and such projection station responsive to external drive means, said apparatus comprising:

drive means for cooperating with such advancement facilitating means for advancing such film strip;
   film image projection means;
   means for receiving such cassette with its projection station and its advancement facilitating means disposed in operative relationship with said film image projection means and said drive means, respectively; and selectively operable means for continuously precluding light rays from entering such projection station during such film processing operation.

2. The apparatus of claim 1 wherein said image projection means includes means for projecting images of such incremental sections along a given optical path, and said precluding means includes means for continuously precluding passage of light along said given path during such processing operation.

3. The apparatus of claim 1 wherein said image projection means includes means for projecting images of such incremental sections along a given optical path, and said precluding means includes a blinder member configured for blocking said given optical path so as to preclude light rays from passing therealong to such projection station when said blinder member is in blocking relation to said given optical path, said blinder member being mounted for displacement between a first position wherein it is in unblocking relation to said given optical path and a second position wherein it is in a blocking relation to said given optical path.

4. The invention of claim 1 wherein such projection station includes means for receiving illumination and for facilitating transmission of such illumination through such incremental sections and outwardly of such cassette, and said image projection means includes means for directing illumination into such projection station for transmission through such incremental sections presented thereat, and said precluding means includes means for precluding operation of said illumination directing means.

5. The apparatus of claim 1 wherein such projection station includes means for receiving illumination and for facilitating transmission of such illumination through such incremental sections and outwardly of such cassette, said apparatus additionally includes a substantially opaque housing, said image projection means includes means for directing illumination into such projection station for transmission through such incremental sections and means for projecting the image bearing rays resulting therefrom along a given optical path extending exteriorly of said housing, and said precluding means includes means for precluding operation of said illumination directing means and for blocking passage of light along said given optical path.

6. The apparatus of claim 1 wherein said projecting means includes an energizable source of illumination and said precluding means includes means for precluding energization of said source during such processing operation.

7. The apparatus of claim 1 wherein said image projection means includes an electrically energizable projection lamp, and said precluding means includes means for preventing energization of said lamp during such processing operation.

8. The apparatus of claim 1 wherein said image projection means includes a projection lamp configured to direct illumination along a first path to such cassette for passage through such projection station and such incremental film portions, and said precluding means includes a blinder member configured for blocking said first path to preclude light rays from passing therealong to such projection station when said blinder member is in blocking relation to said first path, said blinder member being mounted for displacement between a first position, wherein it is in unblocking relation to said first path, and a second position wherein it is in blocking relation to said first path.

9. The apparatus of claim 8 including a substantially opaque housing and wherein said image projection means additionally includes a projection lens assembly disposed within said apparatus housing for projecting image bearing rays transmitted by such incremental film sections along a second optical path extending exteriorly of said apparatus housing, and said blinder member is additionally configured for also blocking said second path so as to continuously preclude light rays from passing therealong to such projection station when said blinder member is in its said second position.

10. The apparatus of claim 1 wherein said projection means includes means projecting images of such incremental sections along a given optical path and means for intermittent blocking of said projection path, and said precluding means includes a blinder member mounted for displacement between a first position wherein it is in unblocking relation to said optical path and a second position wherein it is in blocking relation to said optical path so that said blinder member may be located in said second position during such processing operation and in such first position during such projection operation.

11. Photographic apparatus for use with a film handling cassette including a strip of photographic film, film processing means configured for operation during advancement of such film strip in a given direction, a projection station wherein incremental sections of such film strip may be progressively presented for projection or viewing purposes after being processed, and means for facilitating advancement of such film strip responsive to operative engagement with external drive means, said apparatus comprising:
 drive means for cooperating with such advancement facilitating means for advancing such film in at least such given direction;
 film image projection means;
 means for receiving such cassette with its projection station and its advancement facilitating means disposed in operative relationship with said film image projection means and said drive means, respectively;
 selectively operable means for precluding light rays from entering such projection station during such film processing operation; and
 actuating means for rendering said precluding means operative responsive to advancement of such film in such given direction.

12. The apparatus of claim 11 wherein said actuating means includes means interlocking said drive means and said precluding means for operation of the latter responsive to operation of said drive means so as to advance such film strip in such given direction.

13. Photographic apparatus for use with a film handling cassette including a strip of photographic film, means for processing such film strip during its advancement in a given direction, a projection station wherein incremental sections of such film strip may be progressively presented during its advancement in an opposite direction for projection or viewing purposes after being processed, and means for facilitating advancement of such film strip in either direction across such processing means and such projection station responsive to external drive means, said apparatus comprising:

drive means for cooperating with such advancement facilitating means for advancing such film strip in either direction;

film image projection means including a projection lens assembly for projecting image bearing light rays transmitted by such incremental sections along a given path;

means for receiving such cassette with its projection station and its advancement facilitating means disposed in operative relationship with said film image projection means and said drive means, respectively;

selectively operable means for precluding light rays from entering such projection station during film processing operations, said precluding means including a blinder member configured for displacement between a first position adjoining said given path wherein said blinder member is in unblocking relation to said path and a second position across said given path wherein said blinder member is in blocking relation to said path, said blinder member configured for precluding passage of light rays to such projection station along said given path when said blinder member is disposed in said second position across said given path; and means interlocking said drive means and said precluding means for automatically displacing said blinder member from its said first to its said second position, wherein it is in blocking relation to said given path, responsive to operation of said drive means so as to advance such film in such given direction.

14. The apparatus of claim 13 wherein said projecting means includes means for receiving a projection lamp and means for energizing such lamp for illuminating such incremental film portions, and said precluding means includes means precluding energization of such lamp when said blinder member is in its said second position.

15. The apparatus of claim 14 wherein said energization precluding means is a switch element coupled to said blinder member and configured to provide electrical circuit connection to such lamp only when said blinder is in its said first position.

16. Photographic apparatus for use with a film handling cassette including a strip of photographic film, film processing means configured for operation during advancement of such film strip in a rewind direction opposite to the forward advancement thereof during exposure operations, a projection station wherein incremental sections of such film strip may be progressively presented for projection or viewing purposes after being processed, and means for facilitating advancement of such film strip in such forward and rewind directions responsive to operative engagement with external drive means, said apparatus comprising:

drive means for cooperating with such advancement facilitating means for advancing such film in at least such rewind direction;

film image projection means;

means for receiving such cassette with its projection station and its advancement facilitating means disposed in operative relationship with said film image projection means and said drive means, respectively;

selectively operable means for precluding light rays from entering such projection station during such film processing operation; and means for actuating said precluding means responsive to advancement of such film in such rewind direction.

17. The apparatus of claim 16 wherein said drive means includes at least one rotatable shaft element configured for coupling to such advancement facilitating means of such cassette and for rotation in a given direction in accordance with advancement of such film strip in such rewind direction, and said actuating means includes a member interlocking said precluding means and said shaft element and configured for actuating said precluding means responsive to rotation of said shaft in said given direction.

18. Photographic apparatus for use with a film handling cassette including a strip of photographic film, film processing means configured for operation during advancement of such film strip, a projection station wherein incremental sections of such film strip may be progressively presented for projection or viewing purposes after being processed, and means for facilitating advancement of such film strip responsive to operative engagement with external drive means, said apparatus comprising:

drive means for cooperating with such advancement facilitating means for advancing such film strip;

film image projecting means including means for projecting images of such incremental sections along a given path and a shutter member configured for intermittent blocking of said given path during projection operations; and means for precluding light rays from entering such projection station during such processing operation including means for locking said shutter member in a continuously blocking relation to said given path during such processing operations so as to preclude light rays passing along said given path from entering such projection station.

19. Photographic apparatus for use with a film handling cassette including a strip of photographic film, means responsive to independent actuating means for advancing such film strip, selectively operable film processing means configured for treating substantially the entire length of such film strip with processing fluid during advancement of such film strip, a projection station wherein incremental sections of such film strip may be progressively presented during such advancement for projection or viewing purposes after being processed, and selectively operable means for precluding light rays from entering such projection station following exposure of such film strip, said apparatus comprising:

film image projecting means;

first means for cooperating with such cassette advancement means so as to advance such film strip, to render such processing station operative, and to then render it inoperative following treatment of the length of such film strip, with such processing fluid;

second means for receiving such cassette in operative relation with said first means and said image projection means; and selectively operable third means for rendering such precluding means inoperative responsive to treatment of the length of such film strip with such processing fluid.

20. The apparatus of claim 19 wherein such precluding means includes a blinder member configured for precluding light rays from entering such projection station when such blinder member is in blocking relation thereto, such blinder member being mounted on such cassette for displacement between a first position wherein it is in unblocking relation to said projection station and a second position wherein it is in at least partially blocking relation to such projection station, and wherein said third means includes means for displacing such blinder member from its said second position to its said dirst position following such processing operation.

21. The apparatus of claim 20 wherein said third means additionally includes means for displacing such blinder member from its said first position to its said second position during initiation of such processing operation.

22. The apparatus of claim 19 for use with a cassette which is configured for processing of its film strip during advancement thereof in a rewind direction opposite to the forward advancement thereof during a preceding exposure operation, and wherein said third means includes means responsive to advancement of such film in such forward direction for rendering such precluding means inoperative so as to permit transmission of light rays from such projection station during advancement of such film in such forward direction.

23. Photographic apparatus for use with a photographic film cassette including a cassette housing, an exposed film strip stored within such cassette housing, a film processing station within such cassette housing and configured for operation during advancement of such film strip in a rewind direction from a first storage position to a second, such cassette housing having an opening therein for presenting incremental portions of such film strip during advancement thereof for facilitating projection of images recorded thereon, and means for facilitating advancement of such film strip serially across such opening and through such film processing station, said apparatus comprising:
   an apparatus housing;
   means within said apparatus housing for receiving such cassette so as to at least enclose such cassette opening;
   means within said apparatus housing for cooperating with such advancement facilitating means so as to advance such film strip through said processing station and across said opening in said cassette housing;
   means within said apparatus housing for cooperating with such cassette so as to direct illumination through such incremental portions presented at such cassette opening and for projecting the image bearing rays transmitted therethrough along a given optical path extending exteriorly of said apparatus housing; and
   means within said apparatus housing for precluding operation of said illumination directing and projecting means responsive to advancement of such film strip in a rewind direction so as to maintain such incremental portions in a light-tight environment during such processing operation.

24. A photographic film handling system comprising:
   a multipurpose film handling cassette including:
      a housing retaining a strip of photographic film and configured for facilitating exposure, processing and projection of said film;
      film processing means within said housing;
      a projection station within said housing wherein incremental sections of said film may be progressively presented for projection or viewing purposes after being processed; and
   projector apparatus including:
      film image projection means;
      means for receiving said cassette with its said projection station disposed in operative relationship with said film image projection means; and
      selectively operable means for precluding light rays from entering said projection station during film processing operations.

25. The system of claim 24 wherein said film image projection means includes means for projecting images of said incremental sections along a given optical path from said projection station, and said precluding means includes a blinder member configured for precluding passage of light rays to said projection station along said given path when said blinder member is located in blocking relation across said optical path, said blinder member being mounted for displacement between a first position adjoining said given path wherein it is in unblocking relation thereto and a second position across said path wherein it is in blocking relation thereto.

26. A photographic film handling system comprising:

a multipurpose film handling cassette including:
      a housing configured to be first mounted in a camera to facilitate exposure operations and then in a projector;
      a photographic film strip disposed within said housing;
      film processing means within said housing;
      a projection station including an opening in said housing wherein progressive incremental sections of said film strip may be presented for projection or viewing purposes after being processed; and
      selectively operable means operable for precluding light rays from entering said projection station, said precluding means including an opaque member displaceably mounted on said cassette housing for displacement between a first position adjoining said opening wherein it is in unblocking relation thereto and a second position across said opening wherein it is in blocking relation thereto, said member being located in said second position following exposure operations; and
   a projector comprising:
      first means for operating said cassette through a processing program;
      film image projection means;
      second means for receiving such cassette with its projection station disposed in operative relation with said image projection means; and
      selectively operable means for displacing said opaque member from its said first position following completion of said processing program thereby permitting light rays to enter such projection station for projection operations following said processing operation.

27. The system of claim 26 wherein said precluding means includes an opaque member mounted for displacement into a blocking position across said given path.

28. A motion picture film handling system comprising:
a multipurpose film handling cassette including:
   a housing configured to be first mounted in a camera to facilitate exposure operations and then in a projector;
   a photographic film strip disposed within said housing;
   film processing means;
   a projection station including an opening in said housing wherein progressive incremental sections of said film strip may be presented for projection or viewing purposes after being processed; and
   means alternatively operable for permitting or precluding light rays from entering at least a portion of said projection station, said alternatively operable means including a blinder member configured for blocking light rays from entering said opening when said member is located thereacross, said blinder member being mounted on said cassette for displacement between a first position wherein it is in unblocking relation to said opening and a second position wherein it is in blocking relation to said opening; and
a projector comprising:
   film image projection means;
   means for receiving such cassette with its projection station disposed in operative relation with said image projection means; and
   means for actuating such alternatively operable means including means for displacing said blinder member from its said second position to its said first position following operation of said processing means.

29. Photographic system for processing of a photographic film strip and subsequent projection of images recorded thereon, said system comprising:
a substantially opaque housing;
means within said housing for receiving such film strip and for locating it in a first position within said housing;
means within said housing for reversibly transporting such film strip between said first and a second position within said housing and for presenting incremental sections of such film at a given location within said housing;
means within said housing for processing such film strip during transport of such film strip;
means within said housing for subsequently projecting images of such film strip during transport thereof including means for directing illumination through such incremental sections presented at said given location and for projecting the image bearing rays transmitted by such incremental sections along a given path extending exteriorly of said housing; and
selectively operable means for precluding operation of said directing means and passage of light along said given path during said processing operation.

30. Photographic apparatus for processing and then subsequently projecting or viewing a photographic film strip, said apparatus comprising:
a substantially opaque housing;
means for receiving an exposed photographic film strip substantially completely stored in a first position within said housing;
film image projection means within said housing for illuminating a portion of a film strip and for projecting images therefrom along a path extending exteriorly of said housing;
a selectively operable film processing station for developing, to a visible condition, images recorded on such film strip;
means for advancing such film strip with said housing from its first position serially through said film image projection means and said processing station to a second storage position, for subsequently returning such film strip to its said first position, and for rendering said processing station operable during advancement of such film strip from said first to said second position; and
means for precluding operation of said film image projection means including passage of light rays from the exterior of said housing along said path to the film portions passing through said film image projection means during advancement of such film strip from its said first position to its said second position.

31. The apparatus of claim 30 wherein said processing station is selectively operable, and said apparatus additionally including means for rendering said processing station operable during movement of such film strip from its said first position to its said second position.

32. A photographic film handling system comprising:

a compact multipurpose photographic film handling cassette including:
   a cassette housing configured to be first mounted in a camera to facilitate film exposure operations and then in a projector;
   an exposed, unprocessed film strip stored within said cassette housing;
   a projection station within said cassette housing; and
   means responsive to external actuating means for facilitating the transport of said film strip within said housing serially through said processing and projection stations; and
a projector including:
   film image projection means;
   means for receiving such cassette with its projection station in operative relationship with said film image projection means;
   selectively operable means for precluding light rays from entering said projection station;
   means for actuating said film transport means for transport of said film through said stations; and means for first rendering said precluding means and said processing station operative and for subsequently rendering them inoperative so that with said cassette mounted in said projector said unprocessed film strip may be processed and then subsequently projected for viewing purposes without removing said film strip from said cassette.

* * * * *